(12) United States Patent
Ducato et al.

(10) Patent No.: US 11,807,146 B1
(45) Date of Patent: Nov. 7, 2023

(54) SLEEPING MATTRESS ASSEMBLY WITH SUSPENSION SUPPORT

(71) Applicant: Luno Life, Inc., Bend, OR (US)

(72) Inventors: Peter A Ducato, Bend, OR (US); Landon Burnley, Bend, OR (US); Ricky Lupp, Nashville, TN (US)

( * ) Notice: Subject to any disclaimer, the term of this patent is extended or adjusted under 35 U.S.C. 154(b) by 0 days.

(21) Appl. No.: 18/126,914

(22) Filed: Mar. 27, 2023

Related U.S. Application Data

(63) Continuation-in-part of application No. 17/946,376, filed on Sep. 16, 2022, now Pat. No. 11,612,255.

(51) Int. Cl.
*B60N 3/00* (2006.01)

(52) U.S. Cl.
CPC .................. *B60N 3/008* (2013.01)

(58) Field of Classification Search
CPC ......... A47C 17/00; A47C 17/64; A47C 17/80; A47C 17/645; B60N 3/00; B60N 3/008
See application file for complete search history.

(56) References Cited

U.S. PATENT DOCUMENTS

| | | | |
|---|---|---|---|
| 3,648,306 A * | 3/1972 | Auerbach | B60N 2/2854 |
| | | | 5/118 |
| 5,906,019 A | 5/1999 | McCarthy | |
| 5,966,755 A | 10/1999 | Pittman | |
| 6,568,011 B2 | 5/2003 | Fisher | |
| 6,668,397 B2 | 12/2003 | Olenick | |
| 6,763,540 B1 | 7/2004 | Wang | |
| 8,117,691 B2 | 2/2012 | Bishop | |
| 8,136,182 B2 | 3/2012 | Ellis | |
| 8,234,728 B2 | 8/2012 | Pittman | |
| 8,468,624 B2 | 6/2013 | Pittman | |
| 9,101,203 B2 | 8/2015 | Ely | |
| 10,293,731 B2 | 5/2019 | Saunders | |
| D851,962 S | 6/2019 | King | |
| 10,752,153 B2 | 8/2020 | Medina | |
| D934,595 S | 11/2021 | King | |
| 2005/0102751 A1 | 5/2005 | Kang | |
| 2005/0120477 A1 | 6/2005 | Kennan | |
| 2009/0091165 A1 * | 4/2009 | Thompson | B60N 2/6009 |
| | | | 297/228.12 |
| 2017/0127807 A1 | 5/2017 | Lindberg | |
| 2022/0250522 A1 | 8/2022 | Haycock | |

FOREIGN PATENT DOCUMENTS

| | | |
|---|---|---|
| CN | 201362197 Y | 12/2009 |
| CN | 104494508 A | 4/2015 |
| CN | 306898506 S | 10/2021 |
| DE | 10014316 A1 | 10/2001 |
| JP | H09276080 A | 10/1997 |
| JP | 3107489 U | 2/2005 |

OTHER PUBLICATIONS https://www.amazon.com/Inflatable-Mattress-Backseat-Sleeping-Minivan/dp/B08B8Z5M7F/ Buffing Hero 2022.
https://www.amazon.com/dp/B09C7KYQQ9/ ABE 2022.
https://www.amazon.com/Heart-Horse-Inflatable-Mattress-Sleeping/dp/B0892JHL5B/ Heart Horse 2022.

* cited by examiner

*Primary Examiner* — Fredrick C Conley
(74) *Attorney, Agent, or Firm* — Norvell IP LLC

(57) ABSTRACT

A mattress assembly comprising a mattress with or without a sleeve and a suspension support is disclosed. The suspension support is attached directly to the mattress and provides support for a portion of the body of user while reclining on the mattress over the rear foot wells of a vehicle.

16 Claims, 10 Drawing Sheets

SLEEPING MATTRESS ASSEMBLY WITH SUSPENSION SUPPORT

FIELD OF THE INVENTION

The present invention relates generally to a sleeping mattress assembly with a suspension support for use in the backseat of vehicles for supporting that portion of a user or users reclined on a mattress over one or both rear foot wells.

BACKGROUND OF THE INVENTION

Drivers who spend a great deal of time on the road, or who use their vehicles for camping and other outdoor or recreational activities, attempt to sleep in, on or around their vehicles. For example, setting up a tent on the top of an automobile or setting up a sleeping system in the bed of a pick-up truck provide the vehicle occupants with some options for sleep on the road. However, these sleeping devices do not afford the users an economical, convenient, and comfortable sleeping environment at the same time. As such, devices for sleeping on the inside seats of vehicles, such as sports utility vehicles (SUV), crossovers, sedans and minivans, have become popular. Conventional mattresses, for example foam mattresses and inflatable air mattresses, are often used in this regard, particularly on the inside of vehicles, such as on top of rear fold-flat seats of SUVs.

Fully extended back seat vehicle mattresses span the length of the rear of an SUV when the fold-flat seats are down. These mattresses are also provided on both sides with indentations or recesses to fit around the rear wheel wells/storage areas. The result is a mattress with a smaller width from the rear wheel wells to the hatch. Car campers therefore sleep with their heads on the wider portion of the mattress, inevitably leading to a lack of head support for the portion of the mattress hanging over one or both rear foot-wells.

Sleeping mattress bundles for the back of vehicles are afforded to car campers that include seat-base extenders that fit into the foot-wells of rear seats. A foot-well seat-base extender is either a separate piece from a mattress or attached thereto, but it is usually constructed from the same material as the mattress, i.e. polymers such as polyurethane or polyvinyl chloride. While these seat-base extenders provide adequate support for any back seat vehicle mattress, they often require separate inflation and placement within the vehicle.

Recently, a suspension support device that eliminates the need for seat-base extenders has been disclosed. US 2022/0250522 to Haycock teaches a suspension support device with a panel structure, front support straps and rear support straps. The rear support straps are removably attached to a rear anchoring feature of the vehicle, such as safety loops for car seats. However, this suspension support device might not be compatible with all mattresses and applicable to all vehicles.

There therefore still exits a need for a sleeping mattress with a foot-well support for use in the backseat of vehicles such as those with fold-flat seats. To eliminate the need for seat-base extenders, the support should be removably attached to the sleeping mattress itself to allow for a simple and efficient assembly of the mattress inside a vehicle without having to find the proper anchoring feature, if any, within the vehicle. Further, a support structure that attaches directly to a mattress is desired as it will always complement the mattress to which it attaches. Accordingly, a sleeping mattress assembly with a suspension support is disclosed herein for use in the backseat of vehicles, wherein the suspension support is attached to the mattress.

SUMMARY OF THE INVENTION

In light of the foregoing, it is an object of the present invention to provide a mattress assembly for use with a vehicle having at least two front seats, the mattress assembly comprising a mattress having an outer surface and at least one suspension support device, the at least one suspension support device comprising a rectangular platform having a top end and a bottom end and a length and width sufficiently sized to support at least a portion of one or more users reclined on the mattress over a rear foot-well or foot-wells of the vehicle. The suspension support device of the mattress assembly further comprises a first pair of support straps having first upper ends and first lower ends, wherein the first lower ends of the first pair of support straps are secured to the top end of the rectangular platform. The suspension support device of the mattress assembly can additionally comprise a second pair of support straps having second upper ends and second lower ends, wherein the second upper ends of the second pair of support straps are secured to the rectangular platform. The first upper ends of the first pair of support straps have a first fastening mechanism for removably fastening the first pair of support straps together around one of the at least two front seats of the vehicle, and the second lower ends of the second pair of support straps have a second fastening mechanism that are received by at least one pair of third fastening mechanism secured to the outer surface of the mattress for removably fastening the second pair of support straps to the mattress. It will be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

Accordingly, it can also be an object of the present invention to provide a mattress assembly for use with a vehicle having at least two front seats, the mattress assembly comprising a mattress with a mattress sleeve for housing the mattress and comprising an outer surface and at least one suspension support device, the at least one suspension support device comprising a rectangular platform having a top end and a bottom end and a length and width sufficiently sized to support at least a portion of one or more users reclined on the mattress over a rear foot-well or rear foot-wells of the vehicle. The suspension support device of the mattress assembly further comprises a first pair of support straps having first upper ends and first lower ends, wherein the first lower ends of the first pair of support straps are secured to the top end of the rectangular platform. The suspension support device of the mattress assembly additionally comprises a second pair of support straps having second upper ends and second lower ends, wherein the second upper ends of the second pair of support straps are secured to the rectangular platform. The first upper ends of the first pair of support straps have a first fastening mechanism for removably fastening the first pair of support straps together around one of the at least two front seats of the vehicle, and the second lower ends of the second pair of support straps have a second fastening mechanism received by at least one pair of third fastening mechanism secured to the mattress sleeve for removably fastening the second pair of support straps to the outer surface of the mattress.

As provided herein, the mattress of the mattress assembly can have one or two sections. In an embodiment wherein the mattress has one section, the mattress comprises two opposing sidewalls which can further each define a lateral recess formed therein and sized for accepting at least a portion of a wheel well when the mattress is resting in the back of the vehicle. In an embodiment wherein the mattress has two sections, each section comprises opposing sidewalls, the left sidewall of one section defining a first lateral recess formed therein and the right sidewall of the other section defining a second lateral recess formed therein, wherein the first and second lateral recesses are sized for accepting at least a portion of a wheel well therein when the mattress is resting in the back of the vehicle. The two sections of the two-mattress embodiment can be removably fixed or attached to each other, either directly or, wherein the embodiment of the mattress of the mattress assembly comprises a mattress sleeve, by way of said mattress sleeve.

As further provided herein, the suspension support device of the mattress assembly alternatively can have a portion that is directly secured to the outer surface of the mattress. This particular embodiment of the mattress assembly can have a suspension support device that further comprises a second pair of support straps having second upper ends and second lower ends, the second upper ends of the second pair of support straps are secured to the bottom end of the rectangular platform and the second lower ends of the support strap are directly secured to the outer surface of the mattress. In an embodiment wherein the second pair of support straps are absent, a portion of the rectangular platform is directly secured to the outer surface of the mattress.

Other objects, features, benefits and advantages of the present invention will be apparent from this summary and the following descriptions of certain embodiments and will be readily apparent to those skilled in the art having knowledge of sleeping mattresses for vehicles. Such objects, features, benefits and advantages will be apparent from the above as taken into conjunction with the accompanying examples, figures and all reasonable inferences to be drawn therefrom. The disclosures in this application of all articles and references, including patents, are incorporated herein by reference.

DETAILED DESCRIPTION OF INVENTION

As it relates to certain non-limiting embodiments, the present invention relates to a mattress assembly for use with a vehicle having at least two front seats and at least two rear seats, such as SUVs, jeeps, crossovers, sedans, mini-vans and the like. The mattress assembly of the instant invention is an improvement over the prior art in that it provides a user with a quick and easy assembly of a suspension support device that is either permanently attached, or releasably or removably attached directly to the mattress, thereby providing support for the upper body of the user while reclining on the mattress over the rear foot wells. The following presents non-limiting examples of an embodiment for a mattress assembly with suspension support. It is to be understood that while terms such as "left", "right", "top," "bottom," "front," "back," "side," "rear," and the like may be used in this specification to describe various example features and elements of the invention, these terms are used herein as a matter of convenience, e.g., based on the example orientations shown in the figures or the orientation during typical use.

Figure 1:
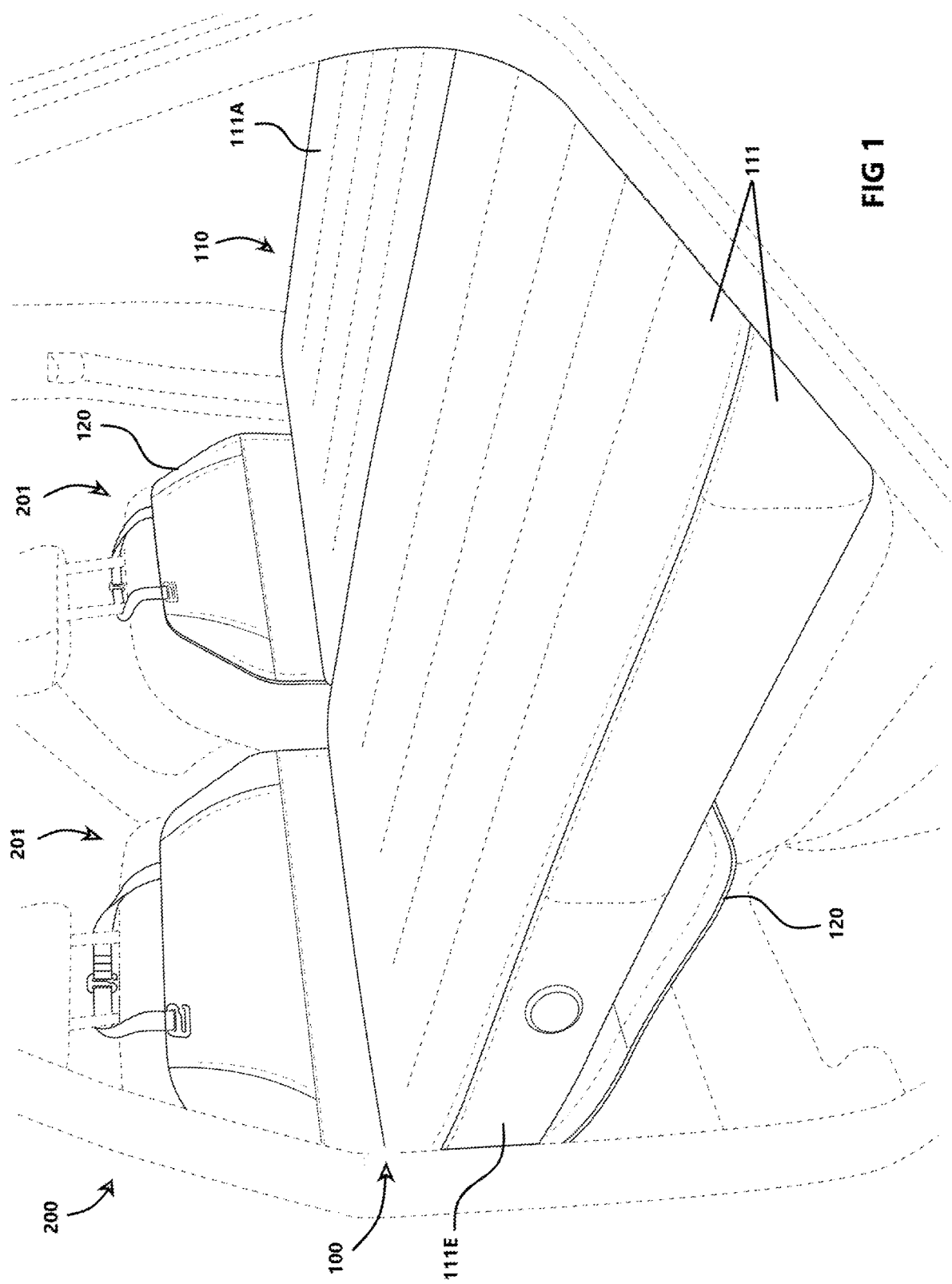
FIG. 1 is a perspective view of a mattress assembly as disclosed herein as assembled in the backseat of a vehicle.
Figure 4:
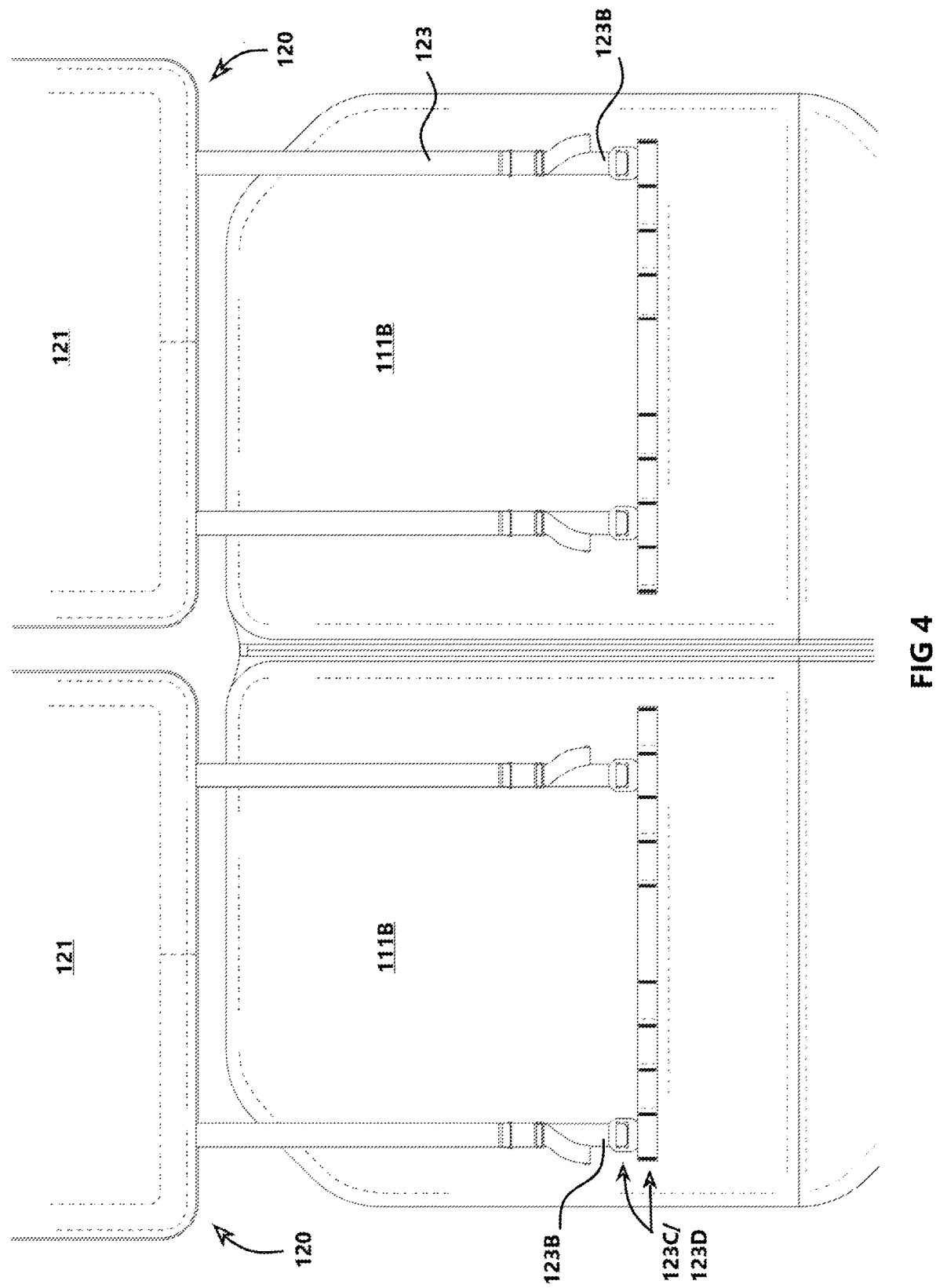
FIG. 4 is an example of a back view of a suspension support of the mattress assembly removably fixed to the bottom wall surface of a mattress.
Figure 5:
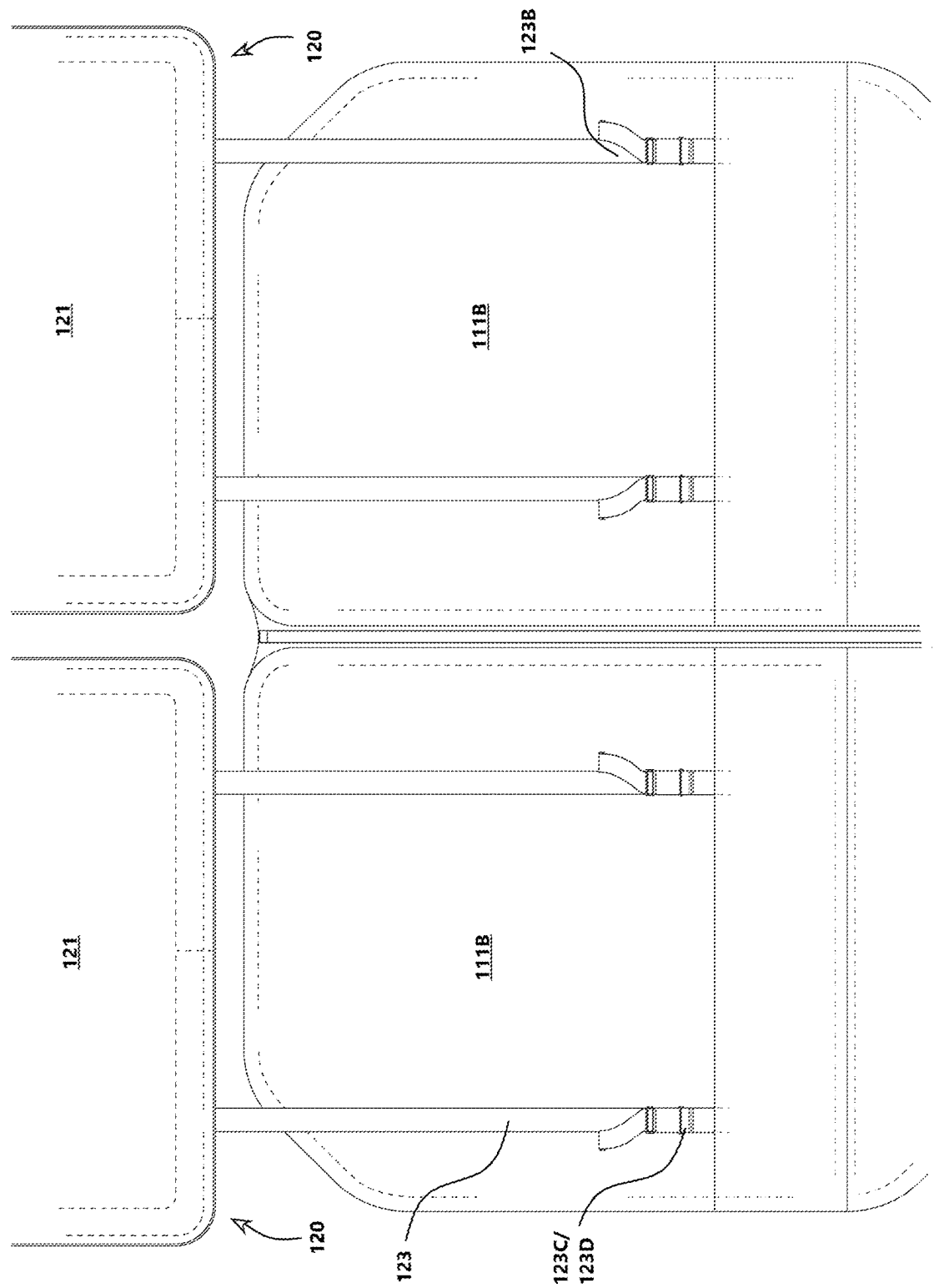
FIG. 5 is another example of a back view of a suspension support of the mattress assembly removably fixed via side release buckle to the bottom wall surface of a mattress.
Figure 6:
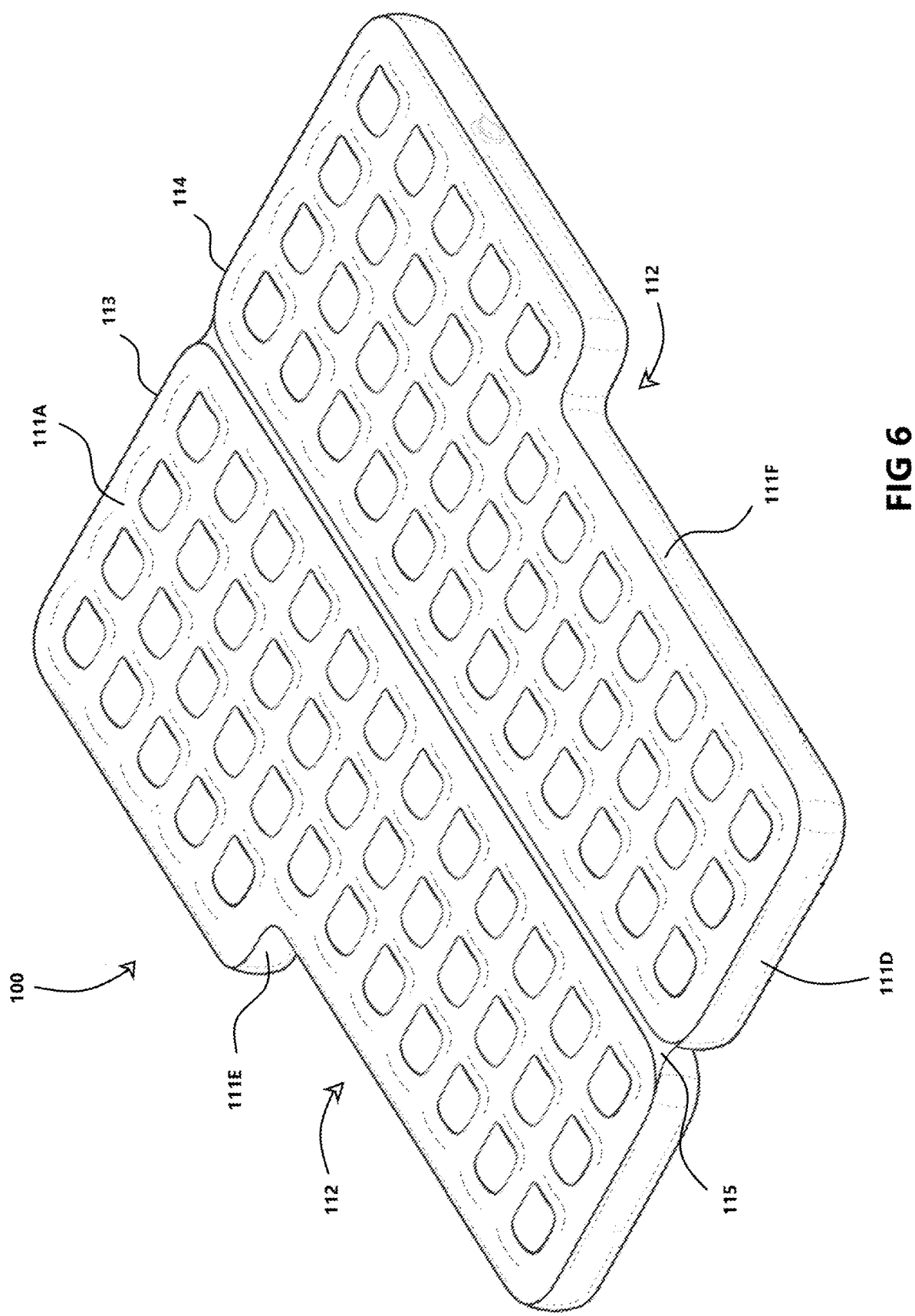
FIG. 6 is a perspective view of an example of a mattress of the mattress assembly.

Referring to the specific embodiments depicted in FIGS. 1-9, the mattress assembly 100 comprises a mattress 110 having an outer surface 111 and at least one suspension support device 120 that, when assembled, support one or more users in the back of a vehicle 200 having at least two front seats 201 and at least two rear seats (not shown), for example, removable seats or rear fold-flat seats that are removed or folded down, respectively, to provide more space (see FIG. 1). The outer surface 111 of the mattress 110 can include a front wall surface 111A (see FIG. 1), a back wall surface 111B (see FIG. 4, which shows the back of a mattress assembly 100), a top wall surface 111C (not shown), a bottom wall surface 111D (see FIG. 1) opposite the top wall surface 111C, and two opposing sidewall surfaces 111E (left) and 111F (right) (see FIG. 6, which depicts an example of a mattress 110 of the mattress assembly 100), the collective outer surface 111 defining a thickness of the mattress 110. The two opposing sidewall surfaces 111E can further define a lateral recess 112 formed therein and extending between the front wall surface 111A and the back wall surface 111B, as shown in FIG. 6. Each lateral recess 112 can also extend down to the bottom wall surface 111D thereby narrowing the width of the mattress 110 the entire length of the lateral recess 112. The lateral recess is sized for accepting at least a portion of a rear wheel well therein when the mattress 110 is resting in the back of the vehicle 200.

The mattress 110 is conventionally constructed from one or more materials including, but not limited to, latex foam, polyurethane foam, fiber pads, or the core may be composed of a bladder member that holds water, air, gels, or other gas, liquid, or semisolid support materials, such as for example, an inflatable air mattress. A non-limiting example of a mattress constructed from a combination of materials is a hybrid of foam or pad and bladder member, e.g. air mattress. In an embodiment wherein the mattress 110 has an inner core composed of a bladder member, said bladder member can be constructed from any pliable and air impermeable polymeric material, including but not limited to, a nylon, a polyurethane or a vinyl such as polyvinyl chloride (PVC). The mattress 110 can be a single-section mattress that covers anywhere from essentially one half of the floor of the back or rear inside of a vehicle from side-to-side to the entire inside floor of the rear of the vehicle from side-to-side, or one with one or more sections, preferably one or two sections. In an embodiment wherein the mattress 110 has two sections, such as depicted in FIG. 6 and disclosed and claimed in U.S. design patent application No. 29/797,436, which is incorporated herein by reference, each section independently has a front wall surface 111A (see FIG. 1), a back wall surface 111B (see FIG. 3), a top wall surface 111C (not shown), a bottom wall surface 111D (see FIG. 1 and FIG. 6) and two opposing sidewall surfaces 111E (left) and 111F (right) (see FIG. 6). A left or first mattress section 113 can therefore include a left opposing sidewall surface 111E defining a lateral recess 112 formed therein while a second or right mattress section 114 (see FIG. 6) can include a right opposing sidewall surface 111F defining another second lateral recess 112 formed therein. Each of the lateral recesses 112 are sized for accepting at least a portion of a rear wheel well therein when the mattress 110 is resting in the back of the vehicle 200. The left mattress section 113 can be releasably or removably attached at or near its right opposing sidewall surface 111F to the second mattress section 114 at or near its left opposing sidewall surface 111E either permanently or by a variety of mechanical fasteners 115, such as for example, with a zipper, a buckle, button snaps, magnets, hook-and-loop fastener, and the like. Preferably, the mechanical fastener 115 is permanently secured on or near the front wall surface 111A of each of the mattress sections 113, 114.

Figure 2:
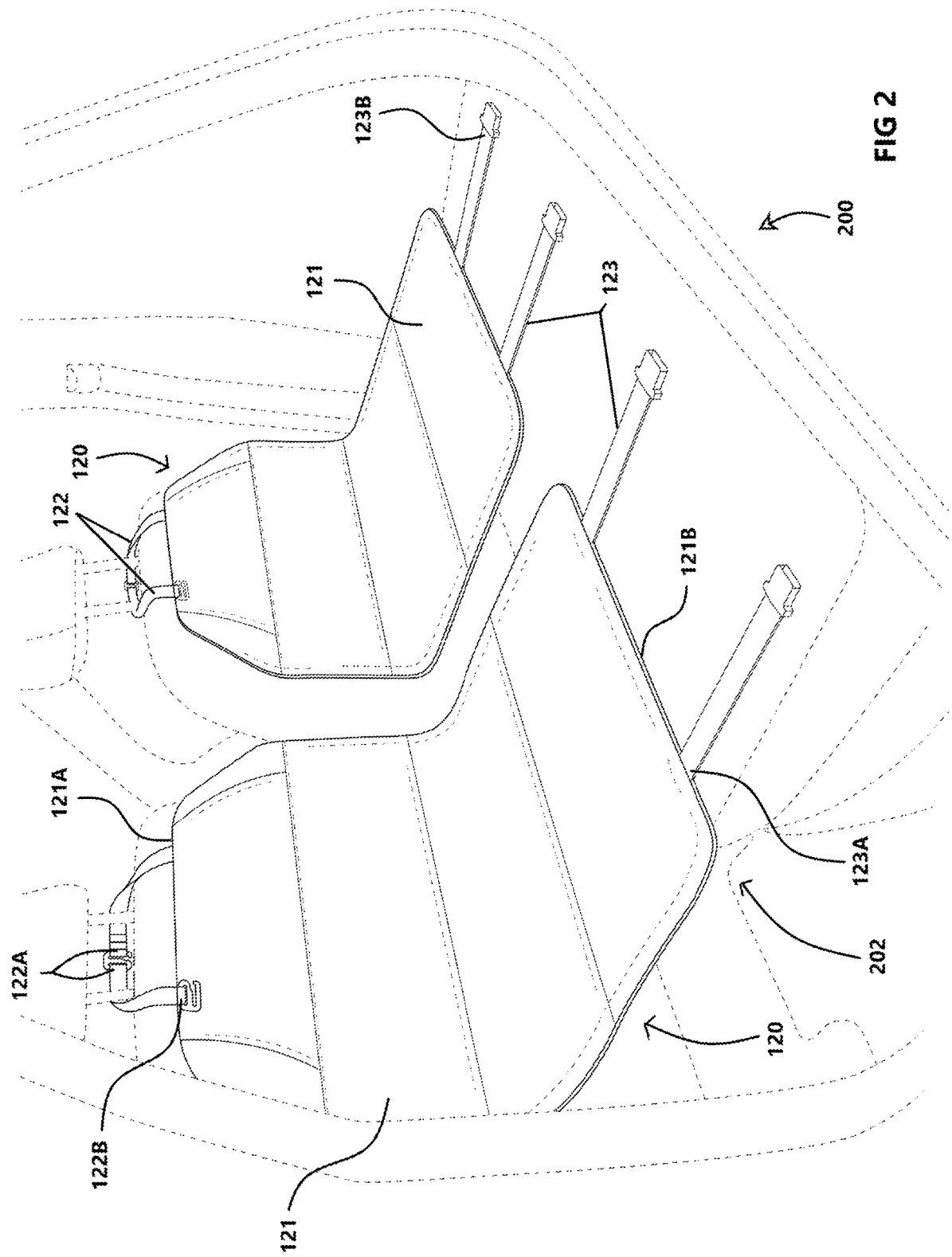
FIG. 2 is the perspective view of the mattress assembly in FIG. 1 with the mattress removed.

As shown in FIG. 2, which depicts the mattress assembly 100 in FIG. 1 without the mattress 110, the at least one suspension support device 120, and preferably one or two suspension support devices 120, of the mattress assembly 100 comprises a rectangular platform 121 having a top end 121A and a bottom end 121B. The platform 121 is generally rectangular in shape and configured with a length and width sufficiently sized to support at least a portion of one or more users reclined on the mattress 110 over one or both of the rear foot-wells 202 of the vehicle 200.

In another certain non-limiting embodiment, the length and width of the platform 121 can range from 600-1000 mm and 400-800 mm, respectively. In an embodiment wherein only a single platform is used, for example in combination with a single-section mattress with a width that covers essentially the entire back floor of a vehicle from side-to-side, the width of the platform can be extended to be configured to support a portion of at least one, and preferably a portion of each one of at least two users, lying on said mattress over one or both of the rear foot-wells, respectively. In certain embodiments, the platform 121 can narrow in width near the top, as shown in FIG. 1 and FIG. 2. The platform 121 is constructed of one or more durable materials, preferably a fabric including but not limited to natural fibers (e.g., cotton, hemp, flax, fur, jute, linen, silk, wool, etc.) and/or synthetic fibers (e.g. latex, nylon, polyester, polyethylene, polyurethane, PVC, rayon, rubber, silicon, spandex, etc.), or a blend thereof. Additionally, these fabrics may have any suitable weave used in the art (e.g., twill weave, plain weave, satin weave, ripstop, etc.), or have any suitable bonding or felting used in the art. In a preferred embodiment, the platform 121 is constructed from a polyethylene, a cotton or PVC, or a combination thereof, such as, for example, sheets of polyethylene, cotton twill fabric or PVC ripstop. A bar or rod, made of metal, wood, fiberglass or the like, can be sewn into or otherwise included into the top end 121A of the platform 121, the bottom end 121B of the platform 121, or both, to maintain the width of said platform 121. Additionally, the platform 121 can include one or more pockets configured therein for storage of personal items. As described with the embodiments above, the platform 121 of the suspension support device 120 therefore functions as a hammock, or something similar thereto, to support a portion, usually the upper body, of a sleeper reclining on the mattress 110 when the mattress 110 is itself resting on the platform 121 over a rear foot-well 202 of a vehicle 200.

Each suspension support device 120 further comprises a first pair of support straps 122 having first upper ends 122A and first lower ends 122B, wherein the lower ends 122B are secured, and preferably permanently secured, to the top end 121A of the rectangular platform 121. The suspension support device 120 of the mattress assembly 100 can optionally comprise a second pair of support straps 123 having second upper ends 123A and second lower ends 123B. The upper ends 123A are secured, and preferably permanently secured, to the bottom end 121B of the rectangular platform 121. In a more preferred embodiment, the first lower ends 122B and the first upper ends 123A are stitched to the top end 121A and the bottom end 121B of the platform 121, respectively. As used herein, "support strap" can refer to a flat strip or tube of a durable material including but not limited to a woven fabric of varying width and fibers, such as for example, a webbing strap. The fibers of the support strap can be made of natural fibers such as cotton and linen, synthetic fibers such as polypropylene and polyester, or high-strength fibers such as Dyneema and Kevlar, and the like. Typical dimensions for the width of the support straps 122, 123 range from 15 mm-25 mm, and preferably 16 mm-22 mm in width. Alternatively, a "support strap" can be meant to include parachute chord or paracord. The support straps may have multiple layers of strapping of adjustable length, width and thickness, including the ability for the excess strap to be rolled up and secured unto itself.

Figure 3:
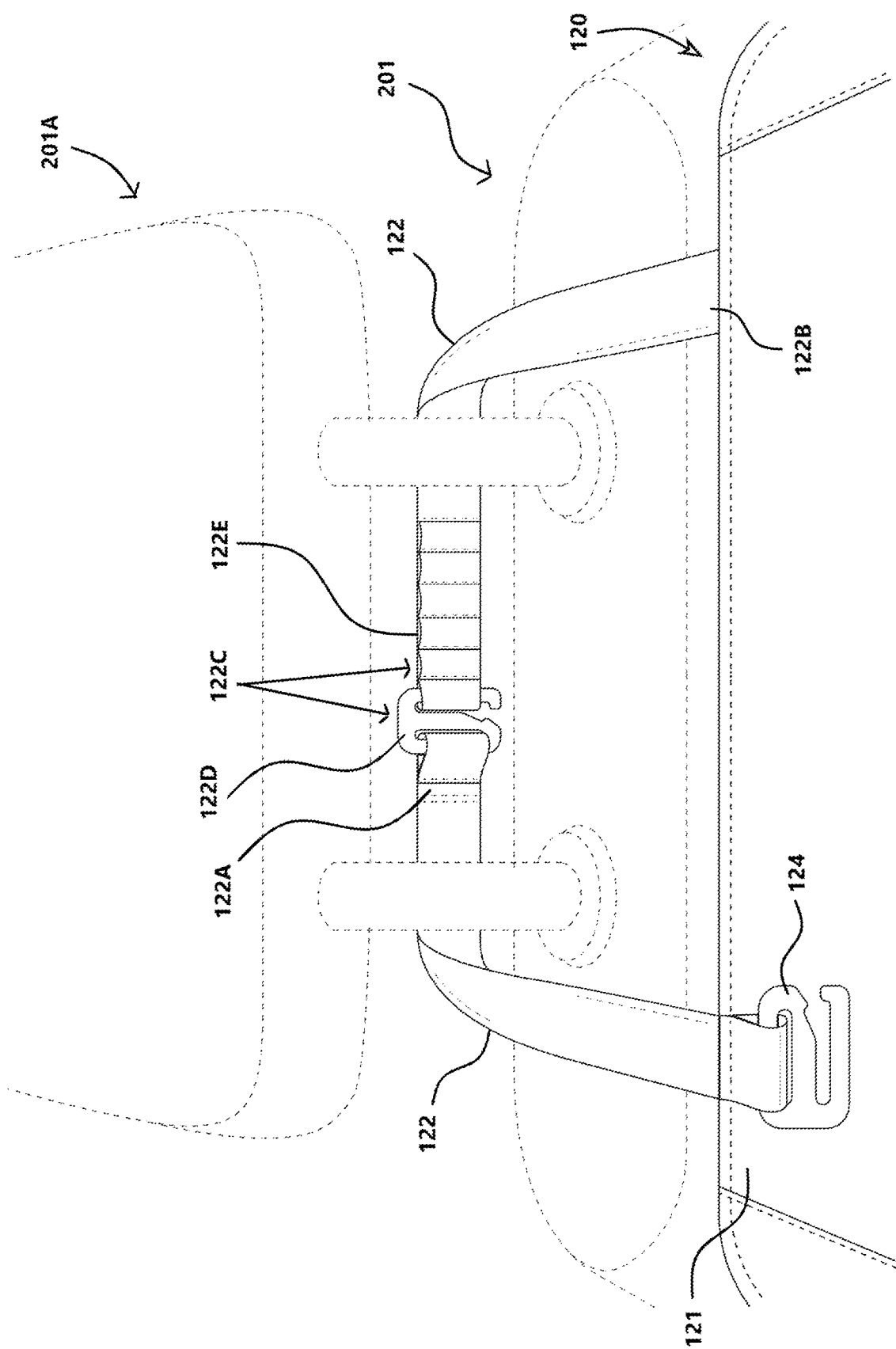
FIG. 3 is a front view of a pair of support straps of a suspension support removably fastened together around the front seat of a vehicle.

The first upper ends 122A of the first pair of support straps 122 of the suspension support device 120 also have a first fastening mechanism 122C for removably fastening the first pair of support straps 122 together around one or both of the at least two front seats 201 of the vehicle 200, and preferably around the headrest(s) 201A of the seat(s) 201, as shown close-up in FIG. 3. It is to be understood by those skilled in the art that the first fastening mechanism 122C includes all traditional fasteners and hardware typically used with webbing straps. The first fastening mechanism 122C may be configured to utilize various types of snaps, rings, fasteners or buckles adapted to particularly receive connectors as well as other strapping mates. Preferably, the fastening mechanism 122C is configured such that a first portion 122D is permanently secured to one of the upper ends 122A of the support straps 122 and adapted to releasably or removably receive a second portion 122E permanently secured to the other upper end 122A of the support strap 122. Examples include but are not limited to hook and loop straps, quick-release hook fasteners, snap-fits, buckles (e.g. side release buckles), hook-and-loop fasteners, D rings, and socket and stud button arrangements. By utilizing these configurations for fastening mechanism 122C, the support straps 122 are removably fastened together around one or both of the at least two front seats 201 of the vehicle 200 and are adjustably configured by a user or users such that the suspension support device 120 provides support over one or both of the rear foot-wells 5 for said user or users reclined on the mattress 110. In a preferred embodiment, the first fastening mechanism 122C is a hook and loop strap such as, for example, the loop-engaging G-hook 122D and MOLLE (Modular Light Weight Load Carrying Equipment) webbing or loop panel 122E depicted in FIG. 3. The suspension support device 120 can optionally include one or more secondary supporting devices 124, including but not limited to G-hooks, buckles (e.g. side-release buckles) and the like, secured near the top end 122A of the platform 121 for holding or supporting personal items and the like.

The second lower ends 123B of the second pair of support straps 123 have a second fastening mechanism 123C that are received by at least one pair of third fastening mechanism 123D secured, and preferably permanently secured, to the outer surface 111 of the mattress 110 for removably fastening the second pair of support straps 123 to the mattress 110. In a specific, non-limiting embodiment of the mattress assembly 100, FIG. 4 depicts a back view of a suspension support device 120, including support straps 123 and platform 121, of the mattress assembly 100 removably attached to the back wall surface 111B of the mattress 110. The support straps 123, as well as fastening mechanism 123C and fastening mechanism 123D, facilitate adjustably configuring the suspension support 120 by a user to provide the maximum suspension support for the mattress 110. It is to be understood by those skilled in the art that each second fastening mechanism 123C/third fastening mechanism 123D combination includes all traditional fasteners and hardware disclosed above for the first portion 122D/second portion 122E, respectively, of the first fastening mechanism 121C. In a preferred embodiment, each second fastening mechanism 123C/third fastening mechanism 123) combination is a hook and loop strap such as, for example, the sternum strap hook 123C and MOLLE (Modular Light Weight Load Carrying Equipment) webbing or loop panel 123D depicted in FIG. 4. In another preferred embodiment, the second fastening member 123C/third fastening mechanism 123I) combination is a side release buckle as shown in FIG. 5.

In another embodiment, the suspension support device can be directly secured to a surface wall of the mattress, either via a second pair of support straps or, where the second pair of support straps are absent, via the rectangular platform, i.e. a portion of the suspension support device other than the first pair of support straps. Wherein the suspension support device is directly secured to a surface wall of the mattress, a portion of said supporting device, and preferably a portion of said suspension supporting device near the lower end of said platform, is directly secured to a wall surface of the mattress, preferably the back wall surface of the mattress. Examples of "directly secured" as used herein can include 1) self-assembly by the user, e.g. via buckles secured to the outer surface of the mattress, the platform or both, to directly secure the suspension support device to a surface of the mattress, 2) permanently secure. e.g. stitching the suspension support device to the surface wall of the mattress with or without a second pair of support straps, or 3) providing frictional support, e.g. by simply placing the mattress on the suspension support device, wherein one or more gripping areas are applied to a portion of the outer surface of the mattress, a portion of the platform, or both. Gripping areas can be applied to the outer surface of the mattress, the platform, or both, and may be made of a grip material that exerts a greater frictional force on the object, e.g. mattress or platform, in contact with the gripping areas. Gripping areas afforded on both the mattress and the platform may make contact with one another for greater frictional support when a user or users are lying on the mattress and the mattress is in turn resting on the platform. Gripping areas may also include multiple gripping members of various different materials, such as, but not limited to, a silicone, a blend of silicone and plastic, a blend of silicone and other material, a plastic, a rubber, a rubberized material, an elastomer material, a polymer material, and the like.

Figure 7:
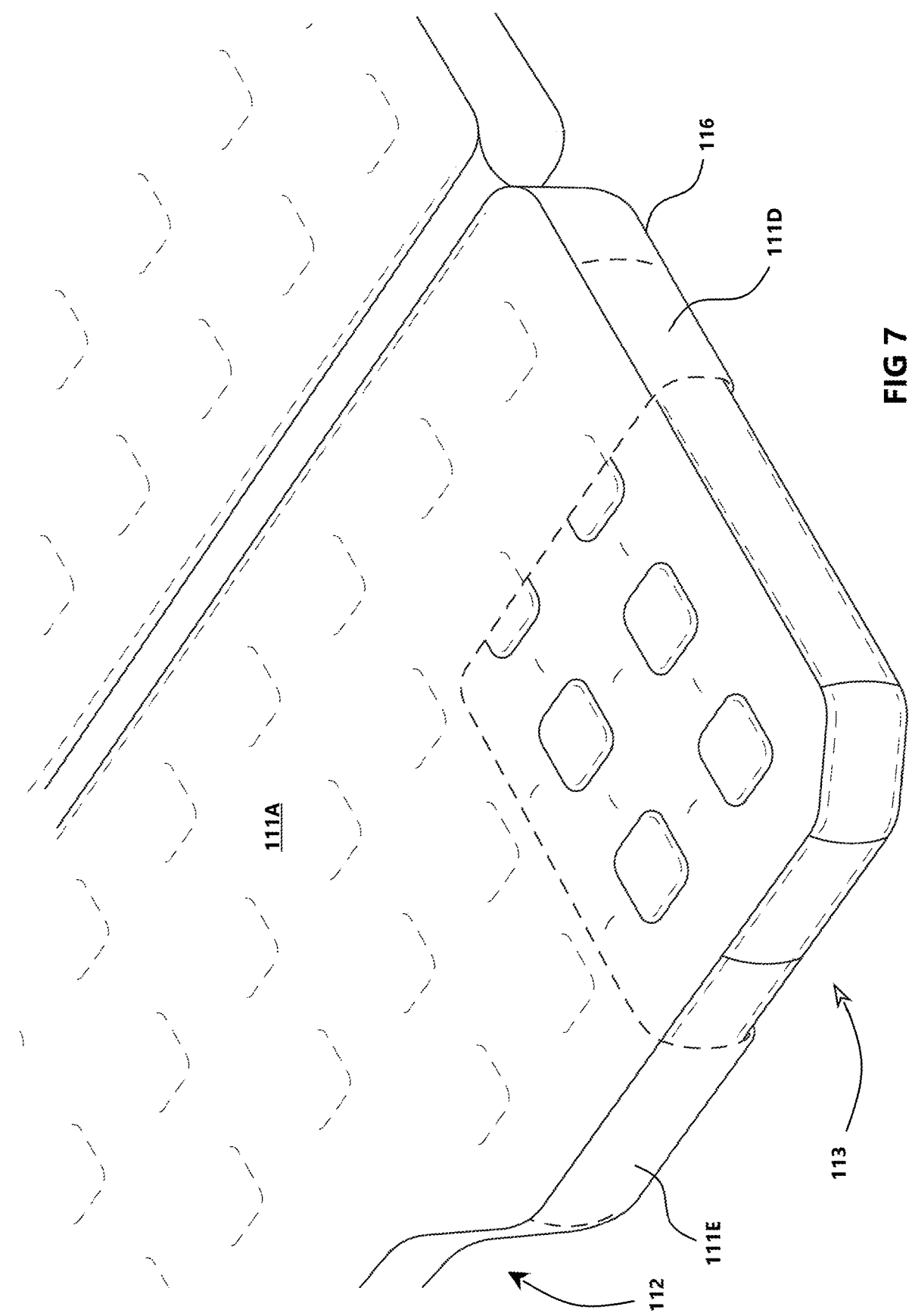
FIG. 7 depicts a mattress of the mattress assembly housed within a sleeve, a cross-section of the sleeve removed to show the mattress.

In another specific, non-limiting embodiment of the mattress assembly 100, the mattress 110 further comprises a sleeve or cover 116 for housing and/or protecting the mattress 110, or both mattress sections 113, as shown in FIG. 7, and mattress section 114. It is to be understood that in the case of FIG. 7, section 114 is configured such that it is the mirror image and right half of section 113 inserted into a similar, mirror image and right half of sleeve 116. The sleeve 116 may be constructed from various types of materials, including, but not limited to, ripstop polyester, 1000 denier nylon and 600D polyester. The mattress 110 or mattress sections 113, 114 is/are permanently housed within the sleeve 116 or alternatively is/are removably attached to the inside of the sleeve 116. In an embodiment wherein the mattress 110 or mattress sections 113, 114 is/are removably attached to the inside surface of the sleeve 116, attachment means (not shown) such as quick-release hook fasteners, snap-fits, hook-and-loop fasteners can be used on the inside of the sleeve 116 to secure the mattress 110 or mattress sections 113, 114. It is to be understood that when the mattress 110 or mattress sections 113, 114 is/are housed within the sleeve 116, the outer surface 111 of the sleeve 116 becomes the outer surface 111 of the mattress 110 for purposes used herein. It follows that the outer surface 111 therefore includes a front wall surface 111A, a back wall surface 111B, a top wall surface 111C, a bottom wall surface 111D and two opposing sidewall surfaces 111E (left) and 111F (right).

Figure 10:
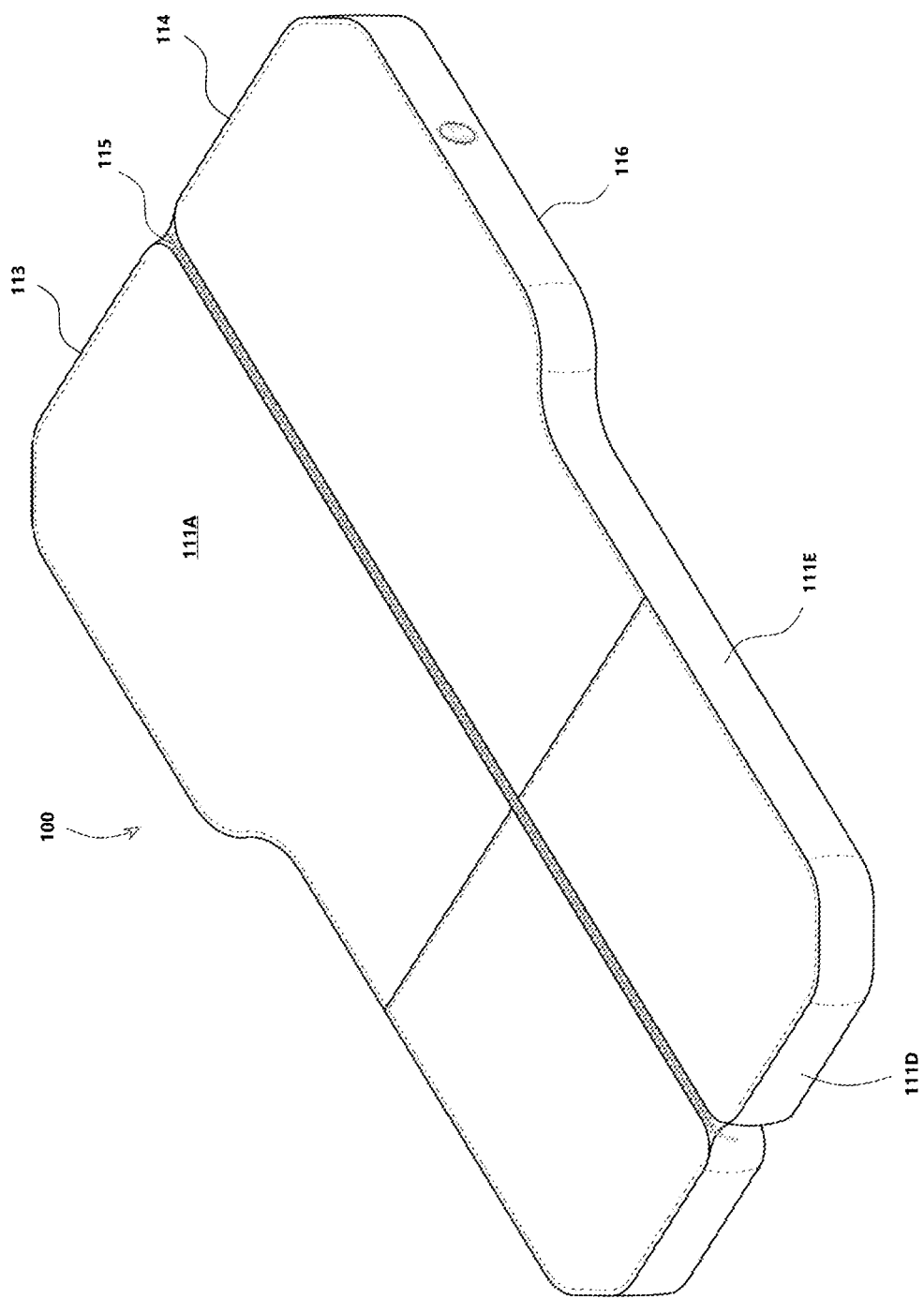
FIG. 10 depicts a sleeved mattress of the mattress assembly with sections removably attached to each other via a zipper.

In an embodiment wherein the mattress 110 has two sections 113, 114 each housed within a left and right, and therefore mirror image, side or half, respectively, of the sleeve 116, each section 113, 114 independently has a front wall surface 111A, a back wall surface 111B, a top wall surface 111C, a bottom wall surface 111D and two opposing sidewall surfaces 111E (left) and 111F (right). A left or first mattress section 113 housed within the sleeve 116 can therefore include a left opposing sidewall surface 111E defining a lateral recess 112 formed therein while a second or right mattress section 114 housed within the sleeve can include a right opposing sidewall surface 111F defining another second lateral recess 112 formed therein. Each of the lateral recesses 112 are sized for accepting at least a portion of a rear wheel well therein when the mattress 110 is resting in the back of the vehicle 200. The sleeved left mattress section 113 can be releasably or removably attached at or near its right opposing sidewall surface 111F to the sleeved second mattress section 114 at or near its left opposing sidewall surface 111E either permanently or with mechanical fastener 115. Preferably, the mechanical fastener 115 is permanently secured on or near the front wall surface 111A of each of the sleeved mattress sections 113, 114. In other words, the mechanical fastener is located on the sleeve 116 itself and preferably in a proximal position on said sleeve 116. FIG. 10 shows the sleeved mattress 110 with sections 113, 114 removably attached to each other via a zipper. Further, in an embodiment wherein the first mattress section 113 is a first inflatable mattress bladder and the second mattress section 114 is a second inflatable air mattress bladder, the left and right sleeve halves each have at least two apertures to accommodate at least one inflation valve and at least one deflation valve on the first inflatable mattress bladder and the second inflatable air mattress bladder, respectively. Alternatively, the left and right sleeve halves can each have only one aperture to accommodate a first inflatable mattress bladder 113 and a second inflatable air mattress bladder 114 that each only have one valve, e.g. a high pressure inflate/deflate valve.

Figure 8:
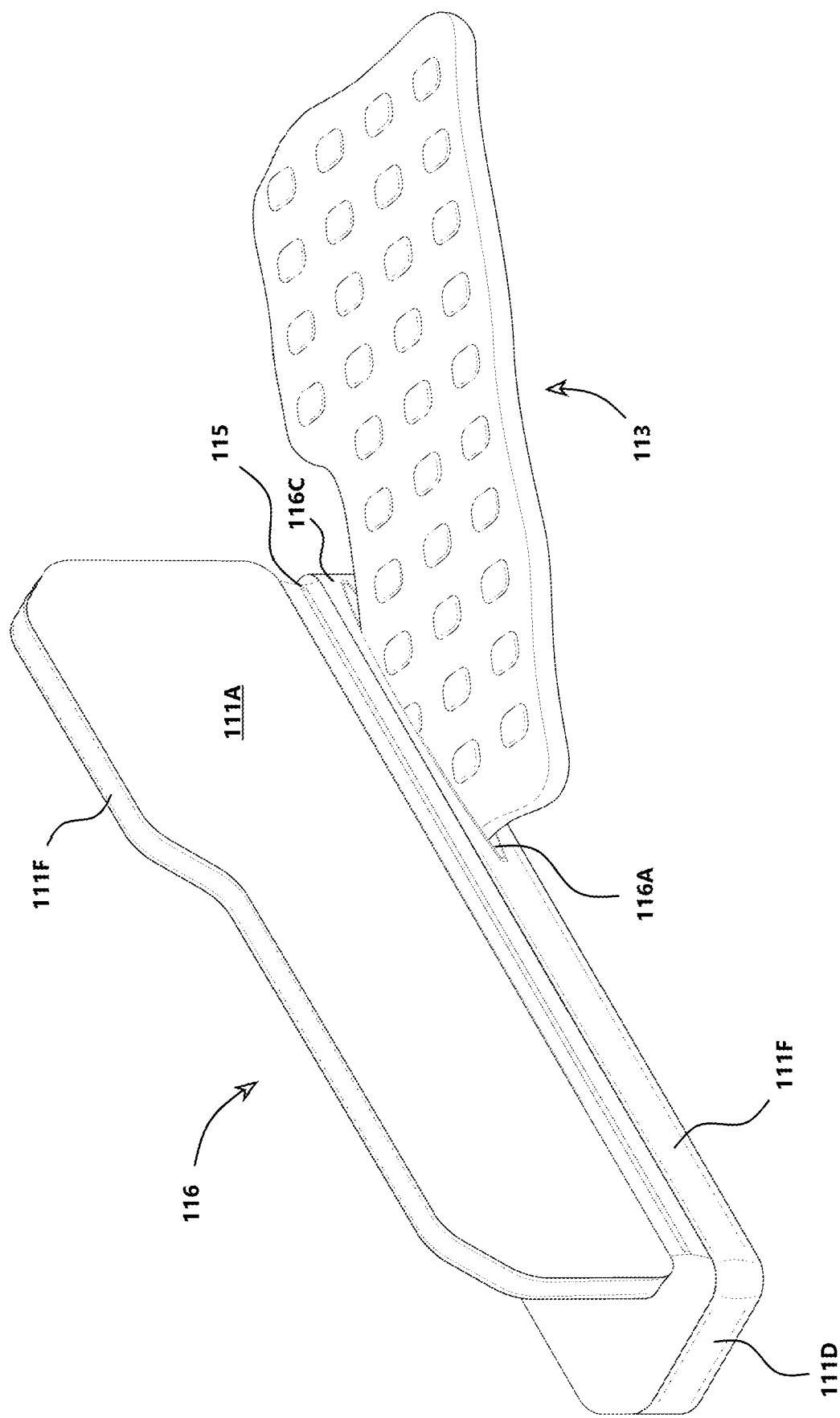
FIG. 8 shows a mattress section being inserted into a sleeve of the mattress assembly through an opening in a sidewall.
Figure 9:
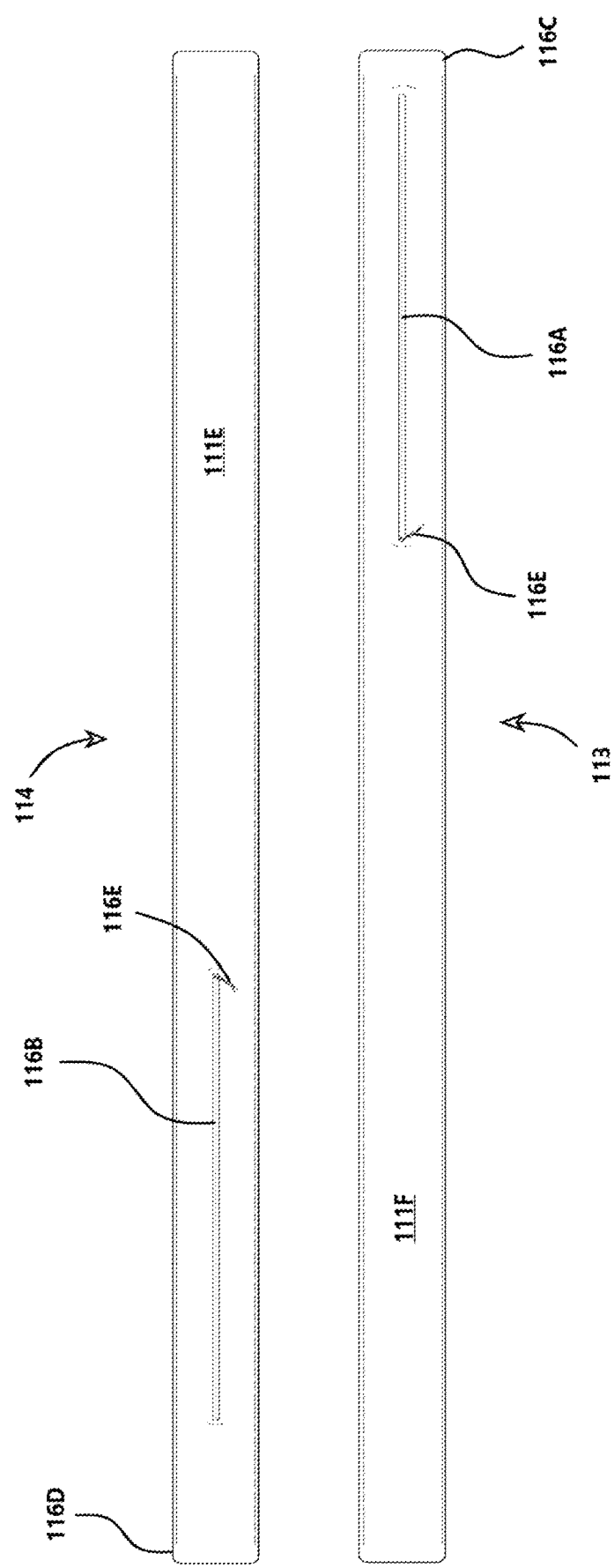
FIG. 9A is a side view of a sidewall surface with opening of a section of a mattress with sleeve.
FIG. 9B is a side view of a sidewall surface with opening of the other section of mattress with sleeve.

As shown in FIG. 8, first mattress section 113 is inserted into the sleeve 116, which is shown folded inwardly, by way of a first opening 116A, preferably through the right opposing, sleeve sidewall surface 111F, and preferably positioned at a first end 116C of said right opposing, sleeve sidewall surface 111F. In this way, section 113 is housed within the sleeve 116 once fully inserted therein. A second opening 116B, as depicted in FIG. 9A, is preferably positioned on the left opposing, sleeve sidewall surface 111E of the second mattress section 114 and provides entry for said second mattress section 114. Section 114 is likewise housed within the sleeve 116 once fully inserted therein. It is to be understood that FIG. 9A shows a side view of left opposing, sleeve sidewall surface 111E of section 114 as if folded inwardly and therefore on top of section 113, which is depicted in FIG. 9B as a side view of right opposing, sleeve sidewall surface 111F. In a preferred embodiment, the second opening 116B is positioned on the left opposing, sleeve sidewall surface 111E of the second mattress section 114 at a second end 116D opposite from the first opening 116A located on the right opposing, sleeve sidewall surface 111F of first section 113. The asymmetric placement of openings 116A, 116B on their respective sidewall surfaces 111E and 111F, respectively, facilitates access of each section 113, 114 to and from the sleeve 116. Each opening 116A, 116B can further be manually closed via a closing mechanism 116E, such as, for example, a zipper.

It is therefore an advantage of the mattress assembly described herein to provide a suspension support that attaches directly to the mattress of the mattress assembly. The mattress assembly comprises a mattress with or without a sleeve as described above and a suspension support that provides support for the mattress while a user is reclined thereon. In particular, the mattress assembly described herein allows a user with a quick and easy assembly of a suspension support device permanently or removably attached directly to the mattress, thereby providing support for a portion of the body of a user while reclining on the mattress over one or both of the rear foot-wheel wells.

Although various embodiments of the mattress assembly are illustrated and described herein, it is appreciated that other embodiments are contemplated as being within the scope of the present disclosure and that various substitutions may be made by those skilled in the art without departing from the spirit of the same.

What is claimed is:

1. A mattress assembly for use with a vehicle having at least two front seats, a rear, and a first and second rear foot-well, the mattress assembly comprising:
    a mattress comprising an outer surface; and
    a suspension support device, the suspension support device comprising
        a rectangular platform having a top end and a bottom end and a length and width sufficiently sized to support at least a portion of at least one user reclined on the mattress over the first or the second rear foot-well of the vehicle,
        a first pair of support straps having first upper ends and first lower ends, wherein the first lower ends of the first pair of support straps are secured to the top end of the rectangular platform, and
        a second pair of support straps having second upper ends and second lower ends, wherein the second upper ends of the second pair of support straps are secured to the bottom end of the rectangular platform;
    wherein the first upper ends of the first pair of support straps have a first fastening mechanism for removably fastening the first pair of support straps together around both of the two front seats of the vehicle; and
    wherein the second lower ends of the second pair of support straps have a second fastening mechanism received by at least one pair of third fastening mechanism secured to the outer surface of the mattress for removably fastening the second pair of support straps to the mattress.

2. The mattress assembly of claim 1, wherein the mattress is a single-section mattress with a width essentially covering a floor of the rear of the vehicle from side-to-side.

3. The mattress assembly of claim 2, wherein the outer surface of the mattress further comprises a top wall surface, a bottom wall surface, a front wall surface, a back wall surface and two opposing sidewall surfaces, the at least one pair of third fastening mechanism secured to either the top wall surface, the bottom wall surface, the front wall surface, the back wall surface or the two opposing sidewall surfaces of the mattress.

4. The mattress assembly of claim 3, wherein each of the two opposing sidewall surfaces of the mattress further define a lateral recess formed therein and extending between the top wall surface and the bottom wall surface, wherein each lateral recess is sized for accepting at least a portion of a wheel well therein when the mattress is resting on the floor of the rear of the vehicle.

5. The mattress assembly of claim 1, wherein the mattress is an inflatable air mattress, a foam mattress, or a combination of both.

6. The mattress assembly of claim 1, wherein the width of the rectangular platform is configured to support at least a portion of at least two users reclined on the mattress over the first rear foot-well and the second rear foot-well, respectively, of the vehicle.

7. A mattress assembly for use with a vehicle having at least two front seats, the mattress assembly comprising:
    a mattress comprising an outer surface; and
    at least one suspension support device, the at least one suspension support device comprising
        a rectangular platform having a top end and a bottom end and a length and width sufficiently sized to support at least a portion of a user reclined on the mattress over a rear foot-well of the vehicle, and
        a first pair of support straps having first upper ends and first lower ends, wherein the first lower ends of the first pair of support straps are secured to the top end of the rectangular platform,
    wherein the first upper ends of the first pair of support straps have a first fastening mechanism for removably fastening the first pair of support straps together around one of the at least two front seats of the vehicle; and
    wherein a portion of the suspension support device other than the first pair of support straps is directly secured to the outer surface of the mattress.

8. The mattress assembly of claim 7, wherein a portion of the suspension support device is permanently secured to the outer surface of the mattress.

9. The mattress assembly of claim 8, wherein the suspension support device further comprises a second pair of support straps having second upper ends and second lower ends, the second upper ends of the second pair of support straps are secured to the bottom end of the rectangular platform and the second lower ends of the support strap are permanently secured to the outer surface of the mattress.

10. The mattress assembly of claim 8, wherein a portion of the rectangular platform is permanently secured to the outer surface of the mattress.

11. The mattress assembly of claim 7, wherein the outer surface of the mattress further comprises a top wall surface, a bottom wall surface, a front wall surface, a back wall surface and two opposing sidewall surfaces.

12. The mattress assembly of claim 11, wherein a portion of the rectangular platform of the suspension support is directly secured to the outer surface of the mattress such that frictional support is provided between the back wall surface of the mattress and the rectangular platform when the at least one user is laying on said mattress.

13. The mattress assembly of claim 7, wherein the mattress is an inflatable air mattress, a foam mattress, or a combination of both.

14. The mattress assembly of claim 7, wherein the mattress is a single-section mattress with a width essentially covering a floor of a rear of the vehicle from side-to-side.

15. A mattress assembly for use with a vehicle having at least two front seats, the mattress assembly comprising:
   a mattress selected from the group consisting of an inflatable air mattress, a foam mattress, or a combination of both, the mattress having an outer surface; and
   at least one suspension support device, the at least one suspension support device comprising
      a rectangular platform having a top end and a bottom end and a length and width sufficiently sized to support at least a portion of a user reclined on the mattress over a rear foot-well of the vehicle,
      a first pair of support straps having first upper ends and first lower ends, wherein the first lower ends of the first pair of support straps are secured to the top end of the rectangular platform, and
      a second pair of support straps having second upper ends and second lower ends, wherein the second upper ends of the second pair of support straps are secured to the bottom end of the rectangular platform;
   wherein the first upper ends of the first pair of support straps have a first fastening mechanism for removably fastening the first pair of support straps together around one of the at least two front seats of the vehicle;
   wherein the second lower ends of the second pair of support straps have a second fastening mechanism received by at least one pair of third fastening mechanisms secured to the outer surface of the mattress for removably fastening the second pair of support straps to the mattress.

16. The mattress assembly of claim 15, wherein the mattress is a single-section mattress with a width essentially covering a floor of a rear of the vehicle from side-to-side.

* * * * *